Dec. 16, 1969    P. DUPEUBLE ET AL    3,484,082
APPARATUS FOR AUTOMATICALLY INJECTING MIXTURES INTO THE GROUND
Filed June 19, 1968
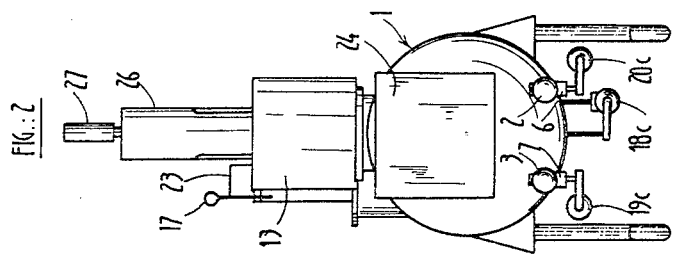
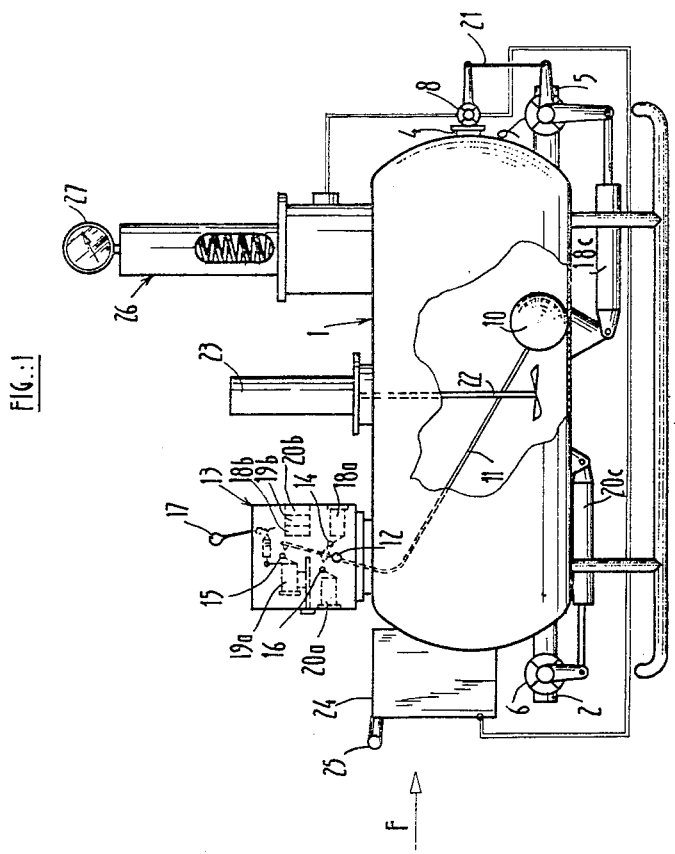

United States Patent Office 3,484,082
Patented Dec. 16, 1969

3,484,082
APPARATUS FOR AUTOMATICALLY INJECTING MIXTURES INTO THE GROUND
Paul Dupeuble, Meudon, and Pierre Marie Leon Seguy, La Celle-Saint-Cloud, France, assignors to Sondages Injections Forages Entreprise P. Bachy, Paris, France, a company of France
Filed June 19, 1968, Ser. No. 738,228
Claims priority, application France, June 23, 1967, 111,762
Int. Cl. B28c 7/12; B01f 15/04
U.S. Cl. 259—153          5 Claims

ABSTRACT OF THE DISCLOSURE

Automatic apparatus comprises a vat in which a stirrer provides for the intimate contact between the components of the mixture to be injected, which components are fed in succession into the vat through corresponding pipes. Each of said pipes is controlled by a valve. Said valves are controlled by the level of the material collected in the vat so as to open until a predetermined level is reached for each successive component. When the material collected has reached a maximum level, said valves close and further valves open two further pipes through one of which compressed air is fed into the vat while the other further pipe delivers the mixture, carried then by a stream of compressed air, into the area to be injected or into another apparatus. The maximum pressure in the vat is preferably adjustable and the locations of the intermediate levels between the layers of successive components are also adjustable.

---

Our invention has for its object an automatic apparatus for the preparation of mixtures of a predetermined composition adapted to be injected into the ground and their injection through feed pipes under head. Said apparatus is adapted to be inserted in a general circuit distributing automatically under predetermined adjustable proportions the mixture, the injection being continued until a predetermined maximum pressure is reached.

If required, our improved apparatus may be fed with a single injectable grout, said apparatus ensuring then only the injection of said grout, until the maximum possible pressure is reached. The apparatus may also transfer if required the mixture into a further injecting apparatus.

An injecting plant may include a multiplicity of our improved apparatus so that the injection may be performed starting from a single high pressure pump for each of the components of the injectable mixture, the preparation of the mixture with the desired ratio between its components and its injection under the selected pressures forming two parameters which may be different for the different individual injecting apparatus, being ensured automatically by our improved apparatus.

The selected injection pressure is adjusted by connecting the apparatus with a hydraulic, hydro-pneumatic or pneumatic accumulator through the agency of pressure-reducing means.

Our improved apparatus includes a pressure-resisting fluid-tight vat enclosing a stirrer for intimately contacting the components of the mixture to be injected and provided with pipes for the admission of the components of said mixture and of compressed air and with at least one further pipe for the delivery of the mixture, each pipe being provided with a valve adapted to open or close the corresponding pipe, while means controlled by the level of the material carried inside the vat produce auomatically, when said level reaches its lowermost limit, the closing of the valves in the pipes delivering the mixture and admitting compressed air and the opening of the valve controlling the pipe admitting the first component of the mixture, while said means produce, when the level has risen to an intermediate position, the closing of the valve in the pipe admitting the first component of the mixture and the opening of the valve in the pipe admitting the second component of the mixture and lastly, when the level has reached its uppermost position, said means control the closing of the valve in the pipe admitting the second component and the opening of the valves in the pipes delivering the mixture and admitting the compressed air, the intermediate level being adjusted so as to allow obtaining a mixture of the desired composition and the injection pressure being also adjustable.

According to a preferred embodiment of our invention, the means controlled by the level of the material in the vat are constituted by a float rigid with a pivoted lever cooperating with switches controlling the valves to be operated when the material reaches the different low, intermediate and high levels referred to, the position of the switch corresponding to the intermediate level being adjustable.

Our improved apparatus may serve for any kind of injection work, for instance with cement grout, loam, sand and/or chemical products, considered separately or in any desired combination. The following description of a preferred embodiment, illustrated in the accompanying drawings given by way of an example and by no means in a limiting sense, will allow ascertaining the principle underlying our invention and the different features of its execution. In said drawings:

FIG. 1 is a diagrammatic view of our improved apparatus.

FIG. 2 is an endwise view of said apparatus as seen in the direction of the arrow of FIG. 1.

The apparatus illustrated includes a fluidtight vat 1, the working pressure of which has been tested and which is provided with pipes 2, 3, 4 and 5 serving respectively for the admission of the first component of the injectable mixture, for the injection of the second component of the latter, for the admission of compressed air and for the delivery of the injectable mixture obtained. The pipes 2, 3, 4 and 5 carry corresponding valves 6, 7, 8, 9 which ensure their opening and closing. The vat 1 encloses a float 10 rigid with a lever 11 pivotally secured to a spindle 12 fitted inside a fluidtight casing 13 located above the vat 1 and communicating therewith. Said casing 13 carries inside it switches 14, 15, 16 controlling the valves 6, 7 and 9 and controlled by the lever 11 for different positions of the latter. The switch 14 is operated by the lever 11 when the float 10 is in its lowermost position inside the vat, that is the position defined by the minimum level allowed for the material inside the vat. The switch 15, the position of which can be adjusted by means of the outwardly projecting lever 17, is operated by the lever 11 when the float occupies an intermediate position inside the vat, which position corresponds to the piling up inside the vat of the desired amount of the first component of the mixture to be injected. The switch 16 is operated by the lever 11 when the float reaches is uppermost position corresponding to the maximum level of material allowed inside the vat. The switches 14, 15, 16 produce through their successive operation the required opening and closing of the corresponding valves 6, 7 and 9 as described hereinabove through the agency of the pneumatic valves 18a, 19a, 20a controlling pneumatically the distributors 18b, 19b and 20b associated each with a corresponding jack 18c, 19c and 20c. It should be remarked that, in order to clarify the drawing, the pneumatic circuits connecting the valves 18a, 19a, 20a through the distributors 18b, 19b, 20b with the jacks 18c, 19c, 20c as also the supply of compressed air for said circuits have not been drawn. Obviously, anyone skilled in the art is capable of suitably designing such circuits.

As to the valve 8 admitting compressed air, it is controlled by the valve 9 delivering the injectable mixture, said valves 8 and 9 being interconnected by a link 21.

The apparatus includes furthermore: A stirrer 22 driven by a motor 23 which ensures the intimate contact of the mixture components and prevents any settling within said mixture during the injection procedure; a pressure reducer 24 connected through the pipe 25 with a supply of compressed air such as a compressor or a bottle containing compressed air while an adjustable safety valve 26 allows giving the air pressure inside the vat the desired value; and a manometer 27 which allows ascertaining at any moment the air pressure prevailing in the vat.

The operation of the apparatus is as follows:

The apparatus being connected with the supplies feeding the components of the mixture and the compressed air and also with the pipe injecting the mixture into the ground, as provided by the pipes 2, 3, 4 and 5 respectively, the float 10 sinks, when the vat 1 contains no longer any injectable mixture, into its lowermost position and produces the operation of the switch 14 which leads to a closing of the valve 9 delivering the injectable mixture together with that of the valve 8 admitting compressed air, the last-mentioned valve being controlled by the valve 9; to an opening of the valve 6 providing for the admission of the first component of the mixture, the valve 7 remaining closed.

The valve 9 being thus closed and the valve 6 open, the level of the material entering the vat 1 rises. When the float reaches the selected intermediate level, the switch 15 is operated, which leads to a closing of the valve 6 admitting the first component; to an opening of the valve 7 admitting the second component.

The valve 7 being now open and the valve 9 remaining closed, the level continues rising inside the vat with the introduction of the second component. When the float reaches its uppermost position, the switch 16 is operated in its turn, which produces: the closing of the valve 7 admitting the second component; the simultaneous opening of the valve 9 delivering the mixture obtained and of the valve 8 admitting compressed air to further such a delivery.

The injection may then be performed under the desired pressure, the pressure-reducing means 24 and the valve 26 having been previously adjusted as required. It will be readily ascertained that, through adjustment of the position of the switch 15 corresponding to the intermediate level, it is possible to adjust the amount of the first component introduced into the vat and consequently the actual composition of the mixture to be injected, the amount of both components considered together being defined by the uppermost level reached by the material inside the vat. The apparatus stops automatically when the counter-pressure exerted by the injected area reaches a value balanching the pressure prevailing inside the vat.

What we claim is:

1. An automatic apparatus for preparing and injecting mixtures of a predetermined composition into a predetermined area, chiefly into the ground, comprising a pressure-resisting fluid-tight vat, a number of pipes opening into said vat, means feeding the different components of the mixture through corresponding pipes into the vat, means for mixing the components fed into the vat to form an injectable mixture, means for feeding compressed air through a further pipe into the vat, the last pipe being adapted to deliver the mixture obtained when subjected to the action of the compressed air out of the vat into the predetermined area, a valve controlling each pipe and means controlled by the level of the components filling the vat and producing automatically when said level is at its lowermost position, the opening of the valve in the pipe through which a first component of the mixture is admitted and the closing of all the other pipes, when the level is at least at one intermediate position, the closing of the said valve in the pipe feeding the first component and the opening of the valve in a pipe feeding a further corresponding component of the mixture and, when said level is in its uppermost position, the opening of the valves in the further and last pipes and the closing of all other pipes and means for adjusting the location of at least one intermediate level in accordance with the ratio desired between the components of the mixture.

2. An apparatus as claimed in claim 1, comprising means for adjusting the pressure in the vat during the injection procedure.

3. An apparatus as claimed in claim 1, comprising an adjustable safety valve controlling the maximum pressure inside the vat.

4. An apparatus as claimed in claim 1, wherein the means controlled by the level of the mixture components carried inside the vat include a float resting on said components, a lever pivotally secured to a stationary point and carrying said float and switches controlling the valves in the corresponding pipes and controlled by the lever in accordance with the position assumed by the latter when the level of the components on which the float rests has reached the corresponding low, intermediate and high positions and means adjusting the position of at least one switch corresponding to an intermediate position.

5. An apparatus as claimed in claim 1, wherein the valves in the further and last pipes are operatively interconnected.

References Cited

UNITED STATES PATENTS

| | | | |
|---|---|---|---|
| 2,263,498 | 11/1941 | Howard | 259—147 X |
| 2,618,576 | 11/1952 | Brown | 259—161 X |
| 2,664,277 | 12/1953 | Davies | 259—161 |
| 3,227,426 | 1/1966 | Williams | 259—153 |
| 3,231,245 | 1/1966 | Harvey | 259—153 |

ROBERT W. JENKINS, Primary Examiner